US006940373B2

(12) United States Patent
Hintz et al.

(10) Patent No.: US 6,940,373 B2
(45) Date of Patent: Sep. 6, 2005

(54) FAST ENGAGE, SLOW RELEASE ELECTRICAL ACTUATOR

(75) Inventors: Michael K. Hintz, Waukesha, WI (US); Michael S. Osvatic, Waukesha, WI (US); Kenyon A. Hapke, Libertyville, IL (US)

(73) Assignee: Ark-Les Corporation, Stoughton, MA (US)

( * ) Notice: Subject to any disclaimer, the term of this patent is extended or adjusted under 35 U.S.C. 154(b) by 0 days.

(21) Appl. No.: 10/991,672

(22) Filed: Nov. 18, 2004

(65) Prior Publication Data

US 2005/0122194 A1   Jun. 9, 2005

Related U.S. Application Data

(60) Provisional application No. 60/524,232, filed on Nov. 21, 2003.

(51) Int. Cl.[7] .............................................. H01H 73/22
(52) U.S. Cl. ............................ 335/31; 335/26; 335/28; 335/29; 335/43; 335/239; 335/240; 335/253
(58) Field of Search ........................ 335/26–34, 43–45, 335/167, 239, 240, 253–255

(56) References Cited

U.S. PATENT DOCUMENTS

| 5,520,424 | A | 5/1996 | Hapke |
| 5,572,869 | A | 11/1996 | Schantz |
| 5,823,017 | A | 10/1998 | Hapke |
| 6,293,289 | B1 | 9/2001 | Hapke |
| 6,363,755 | B1 | 4/2002 | Hapke |
| 6,434,977 | B1 | 8/2002 | Hapke |
| 2002/0101313 | A1 * | 8/2002 | Dirnberger et al. ......... 335/220 |

FOREIGN PATENT DOCUMENTS

GB            2080399        *  2/1982

* cited by examiner

*Primary Examiner*—Ramon M. Barrera
(74) *Attorney, Agent, or Firm*—Quarles & Brady LLP

(57) ABSTRACT

A fast engage, slow release electrical actuator combines an electromagnetic actuator with a thermal actuator, the latter which retains the electromagnetic actuator after the former has been actuated to delay the release thereof.

19 Claims, 3 Drawing Sheets

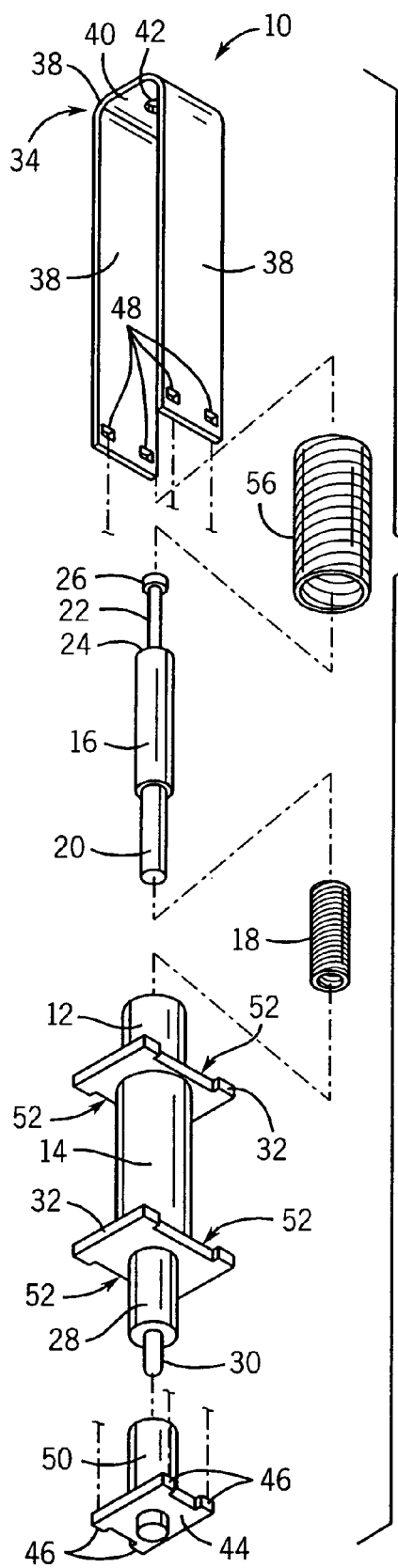
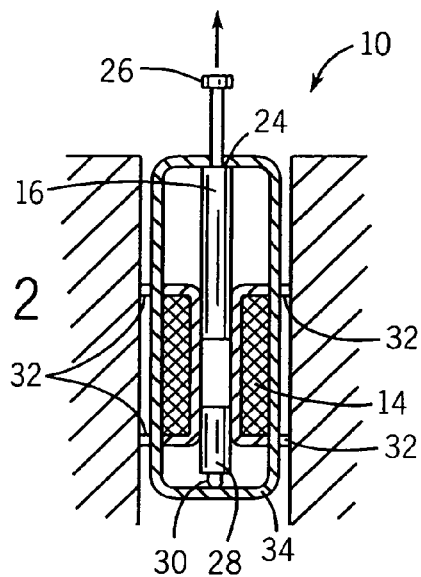
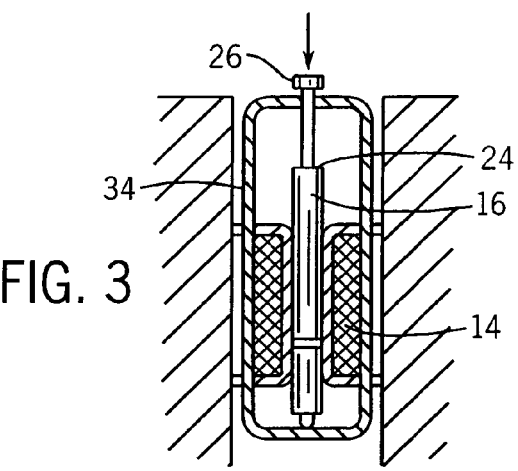
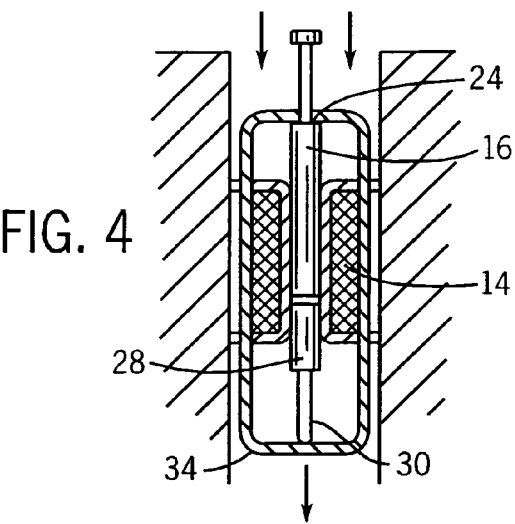
FIG. 1
FIG. 2
FIG. 3
FIG. 4

FAST ENGAGE, SLOW RELEASE ELECTRICAL ACTUATOR

CROSS-REFERENCE TO RELATED APPLICATIONS

This claims the benefit of Provisional Application No. 60/524,232, filed on Nov. 21, 2003.

BACKGROUND OF THE INVENTION

The present invention relates to electrical actuators useful in washing machines and the like, and in particular to an actuator that provides for rapid initial engagement with delayed release.

Electrical actuators that rapidly engage upon receipt of an actuation signal, but that delay releasing when the actuation signal ceases may be used, for example, in a lid lock on a clothes washing machine. With such an actuator, the lid locks quickly upon the start of the spin cycle and remains locked for a period of time after the spin cycle ends to allow the spin basket to coast to a stop before the lid can be opened. Desirably, the electrical actuator should provide a slow release not only when the actuation signal ends, but in the event of unexpected power loss.

Bi-metallic actuators, known in the art, can provide a slow release, either at the end of an actuation signal (heating the bi-metal) or upon power failure, as the bi-metal element cools. However, the same thermal mechanism that slows the cooling of the bi-metal also delays its heating undesirably delaying the engagement of the actuator.

U.S. Pat. No. 5,823,017, assigned to the assignee of the present invention and hereby incorporated by reference, describes an electromagnetic actuator that may be actuated rapidly and which is bi-stable so as to retain actuation even in the absence of power. An associated timing circuit provides for a delayed release of the actuator upon cessation of the actuation signal. An energy storage capacitor allows operation of the timer circuit even in the absence of power.

BRIEF SUMMARY OF THE INVENTION

The present invention provides an electrical actuator combining an electromagnetic actuator such as a solenoid, and a thermal actuator such as a wax motor to provide fast engagement and slow release. In a preferred embodiment, the wax motor is heated by the coil of the electromagnetic actuator allowing a single control signal to be used for the actuation. The use of a thermal actuator instead of a bi-stable electromagnetic actuator eliminates the need to store electrical energy for release in the event of power failure. A simple clip structure may be used to join the electromagnetic actuator and thermal actuator when their operators are co-axial and opposed, providing extremely inexpensive and simple mechanism.

Specifically, the present invention provides a fast actuation, delayed release electrical actuator having an electromagnetic actuator responding to an initiation of an electrical current to move an operator from a first position to a second position, and a thermal actuator responding to a cessation of the electrical current to delay movement of the operator from the second position to the first position for a predetermined period after cessation of the electrical current.

It is one object of at least one embodiment of the invention to provide a self-contained mechanism that provides fast actuation and delayed release without timer circuitry.

The thermal actuator may be heated by current passing through a solenoid coil of the electromagnetic actuator. The heating of the thermal actuator may be inductive heating or conductive heating.

It is thus another object of at least one embodiment of the invention to eliminate the need for a separate heater for the thermal actuator.

The actuator may include a heating control reducing heating of the thermal actuator after the operator has moved from the first position to the second position.

Thus it is another object of at least one embodiment of the invention to provide rapid heating of the thermal actuator while preventing overheating or excess power usage.

The heater control may control current to the electromagnetic actuator, for example, by a switch that is actuated by movement of the operator or through a timer-controlled, current-controlled or heat sensitive switch.

It is another object of at least one embodiment of the invention to provide a simple method of heat control by controlling current.

The solenoid coil may have multiple windings, and the heating control may change the winding connections, for example, from parallel to serial or from two coils to one coil.

Thus it is another object of at least one embodiment of the invention to provide current control without the need for complex circuitry.

The multiple windings may be bifilar or may be spatially separated within the solenoid.

Thus it is another object of at least one embodiment of the invention to allow for flexible control of the distribution of heating.

The thermal actuator may be a wax motor and the electromagnetic actuator may include a solenoid coil wrapped around the wax motor.

Thus is an object of at least one embodiment of the invention to provide a simple, compact design.

A piston of the wax motor may extend along an axis of the solenoid coil in a first direction and the magnetically attractable actuator element of the electromagnetic actuator may be movable along the axis in a second direction, and the piston and actuator element may be joined by a rigid clip having a first end engaging a portion of the piston, and a second end engaging a portion of the actuator element to limit a maximum separation of the portions while allowing movement to lesser separations.

Thus it is another object of at least one embodiment of the invention to provide a simple mechanism for combining a thermal and electromagnetic actuator.

These particular objects and advantages may apply to only some embodiments falling within the claims and thus do not define the scope of the invention.

BRIEF DESCRIPTION OF THE DRAWINGS

FIG. 1 is an exploded, perspective view of an actuator according to a first embodiment of the present invention having a coaxial electromagnetic solenoid centered about a wax motor;

FIG. 2 is an elevational cross-section through the assembled actuator of FIG. 1 in a pre-actuation state with a solenoid plunger fully extended and a wax motor piston fully withdrawn;

FIG. 3 is a figure similar to that of FIG. 2 showing the actuator immediately after application of an actuation signal in an actuation state with the solenoid plunger fully withdrawn and the wax motor piston fully withdrawn;

FIG. 4 is a figure similar to that of FIGS. 2 and 3 showing the actuator after cessation of the actuation signal in a post-actuation state with the solenoid plunger fully retracted and the wax motor piston fully extended;

DETAILED DESCRIPTION OF THE PREFERRED EMBODIMENT

Figure 5:
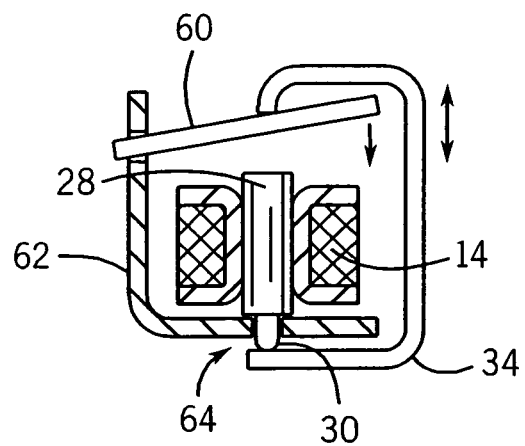
FIG. 5 is a cross-sectional view similar to that of FIG. 2 showing an alternative embodiment of the invention using a hinged armature instead of a plunger.

Referring to FIG. 1, an actuator 10 of the present invention provides generally a tubular form 12 about which a solenoid coil 14 may be wound. The tubular form 12 includes a central bore (not visible in FIG. 1) which may receive a generally cylindrical ferromagnetic plunger 16 typically constructed of iron or steel. The plunger 16 may slide smoothly within the bore of the tubular form 12 as attracted by the solenoid coil 14 when the latter is energized.

The solenoid coil 14, as is understood in the art, is a coil of conductive wire and includes terminals or leads (not shown) for introducing a current into the solenoid coil to generate an axial magnetic field.

The plunger 16 includes a reduced diameter inner end 20 that may engage the inside diameter of helical return spring 18. The helical return spring 18, in turn, has an outside diameter fitting freely within the bore of the tubular form 12. In its relaxed state, the helical return spring 18 extends beyond the inner end 20 of the plunger 16 so that when the plunger 16 and helical return spring 18 are inserted into the bore of the tubular form 12, the outer end of the helical return spring 18 engages structure within the bore of the tubular form 12, such as a shelf or an end of a wax motor (described below) so that the helical return spring 18 provides an outward return force to the plunger 16 after the plunger 16 is attracted into the solenoid coil 14 and then released.

The outer end of the plunger 16 includes an extension arm 22 also of reduced diameter with respect to the plunger 16 to provide a shoulder 24 at the outer end of the plunger 16. The outer end of the extension arm 22 includes a head 26 to engage a device (not shown) intended to be actuated by the actuator 10.

A cylindrical wax motor 28 is located in the bore of the tubular form 12 at an end opposite that end of the bore receiving the plunger 16. The wax motor 28 has a piston 30 extending outward from the solenoid coil 14 along the axis of the bore of the tubular form 12 in the opposite direction from the plunger 16. As is understood in the art, the wax motor 28 contains a thermally expanding material such as wax which, when heated, expels the piston 30. The wax motor 28 may be attached to the tubular form 12 by a press fit or may be simply blocked from upward motion by a shelf or the like within the bore of the tubular form 12.

Continuing to refer to FIG. 1, the tubular form 12 has stilt plates 32 extending perpendicularly to the axis of the bore of the tubular form 12 abutting each end of the solenoid coil 14. The stilt plate 32 at the end of the tubular form 12 surrounding the plunger 16 provides an opening through which an upper end of the tubular form 12 may pass and extend a distance through the stilt plate 32 away from the solenoid coil 14. The stilt plate 32 at the end of the tubular form 12 surrounding the wax motor 28 provides an opening allowing an end of the wax motor 28 and piston 30 to extend therethrough. Projections extending from the stilt plates 32 allow the tubular form 12 to be attached to the stationary structure to provide an anchor point for the actuator 10.

The plunger 16 extends out of one end of the tubular form 12 and the piston 30 of the wax motor 28 extends out of the other end of the tubular form 12. The outward, opposite projections of the plunger 16 and piston 30 are contained by a bridle element 34 consisting of a U-band 36 having a base 40 between two axially extending legs 38. The base 40 has a bore 42 sized to pass the head 26 of the plunger 16, but to block shoulder 24 of the plunger thereby restraining outward movement of the plunger 16.

The legs 38 of the bridle element 34 extend on either side of the solenoid coil 14 to an opposite end of the tubular form 12 near the wax motor 28. The free ends of the legs 38 are joined by a spanner 44 having teeth 46 press fit into corresponding sockets 48 in the ends of the legs 38 to retain these parts together once they are assembled. The spanner 44 includes an upwardly extending cup 50 that may receive the lower end of the wax motor 28 when the piston 30 is retracted so that the cup 50 abuts one stilt plate 32.

Generally, the legs 38 are retained within notches 52 in the edges of the stilt plates 32 to slide freely with respect to the stilt members 23 parallel to an axis of the bore of the tubular form 12 and hence parallel to movement of the plunger 16 and piston 30 of the wax motor 28. The bridle element 34 including spanner 44, cup 50, and U-band may be ferromagnetic so as to provide for a flux path assisting in retraction of the plunger 16 when the solenoid coil 14 is energized as will be described.

A helical compression spring 56 fits between the base 40 of the bridle element 34 and one stilt plate 32 as retained around an extending end of the tubular form 12. The helical compression spring 56 serves to bias the bridle element 34 outward compressing the piston 30 of the wax motor 28 inward. In the position of maximum outward bias, the base 40 of the bridle element 34 allows full extension of the plunger 16 while the cup 50 of the bridle element 34 abuts its associated stilt plate 32.

Referring now to FIG. 2, when the actuator 10 is in a pre-actuation state, the plunger 16 is biased upward by the spring 18 (not shown in FIG. 2 for clarity) so that the head 26 of the plunger 16 is in a full extension position. The solenoid coil 14 is de-energized and the wax motor 28 is cool so that its piston 30 is fully retracted allowing the bridle element 34 to be biased to its full upward position by spring 56 (also not shown in FIG. 2 for clarity). The shoulder 24 of the plunger 16 is restrained from further outward motion by the base 40 of the bridle element 34.

Referring now to FIG. 3 when the actuator 10 is in an actuation state, the plunger 16 (also simplified for clarity) is pulled into the tubular form 12, drawing the head 26 to its fully retracted position. The shoulder 24 of the plunger 16 is pulled away from the base 40 of the bridle element 34, the latter which is held outward by the spring 56 shown in FIG. 1. This magnetic field produced by current passing through the solenoid coil 14 is conducted in part by the metallic parts of the bridle element 34 improving this force of attraction.

Referring now to FIG. 4, when the actuator 10 is in a post-actuation state, after a period of actuation of the solenoid coil 14 during which the wax motor 28 becomes heated, the piston 30 is forced outward from the casing of the wax motor 28, pushing outward on the spanner 44 of the bridle element 34 whose base 40 moves inward to again engage the shoulder 24 of the plunger 16. While the present inventors do not wish to be bound by a particular theory, it is believed that the heating is both a result of the conduction of heat from the windings of the solenoid coil 14 whose temperature rises from resistive heating, and a result of inductively induced eddy currents in the components of the wax motor 28 itself.

It will be understood that in the post-actuation state, a loss of power to the solenoid coil 14 resulting either from a disabling of the actuator 10 by turning off the solenoid coil 14 or a loss of power to the system holding the actuator 10 will not cause an immediate release or extension of the plunger 16 which, although no longer held by the magnetic attraction of the solenoid coil 14, is held retracted by the bridle element 34 as biased by the wax motor 28.

This state persists until the wax motor 28 cools to allow retraction of the piston 30 under the force of the helical spring 56 (shown in FIG. 1) acting on the bridle element 34. The speed of this cooling process may be controlled to be much longer than the release of the plunger 16 by the solenoid coil 14 when power is cut from the solenoid coil 14.

In this way, the plunger 16 may be rapidly actuated to move inward, but after a predetermined actuation time such as heats the wax motor 28, the plunger 16 will extend slowly as dictated by the cooling of the wax motor 28. The relative speed of heating of the wax motor 28 may generally be set to be much faster than the speed of cooling of the wax motor 28 by control of the heating power and thermal resistance between the wax motor 28 and the environment.

After cooling of the wax motor 28, the actuator 10 returns to the de-energized state shown in FIG. 2.

Referring now to FIG. 5, it will be understood that this same principle described above may be applied to an electrical "relay-style" design. In this embodiment, the wax motor 28 provides a core for the solenoid coil 14 with the height of the solenoid coil 14 being substantially the same as the length of the wax motor 28. A ferromagnetic frame 62 is attached to the solenoid coil 14 and supports a hinged armature 60 that, in a released position, may swing outward away from the core formed by wax motor 28 and in an engaged position, when the solenoid coil 14 is energized, may swing inward toward the core formed by wax motor 28. The armature may be optionally associated with electrical contacts (not shown) as will be understood to those of ordinary skill in the art.

The frame 62 includes an opening 64 in a face of the frame 62 supporting the side of the solenoid coil 14 away from the armature 60 allowing downward passage of the piston 30. The piston 30 may in turn engage a bridle element 34 also engaging the outer surface of the armature 60.

When the armature 60 is attracted inward by energizing the solenoid coil 14, it moves quickly under the influence of the electromagnetic field. With heating of the wax motor 28 by the solenoid coil 14, the piston 30 extends from the wax motor 28 causing the bridle element 34 to hold the armature 60 inward independently of its magnetic attraction. Again, release of the armature 60 is delayed by the time required to cool the wax motor 28. For clarity, a spring for biasing the armature 60 and for biasing the bridle element 34 are not shown in FIG. 5. The position and function of these springs will be understood to one of ordinary skill in the art from the above description.

Figure 6:
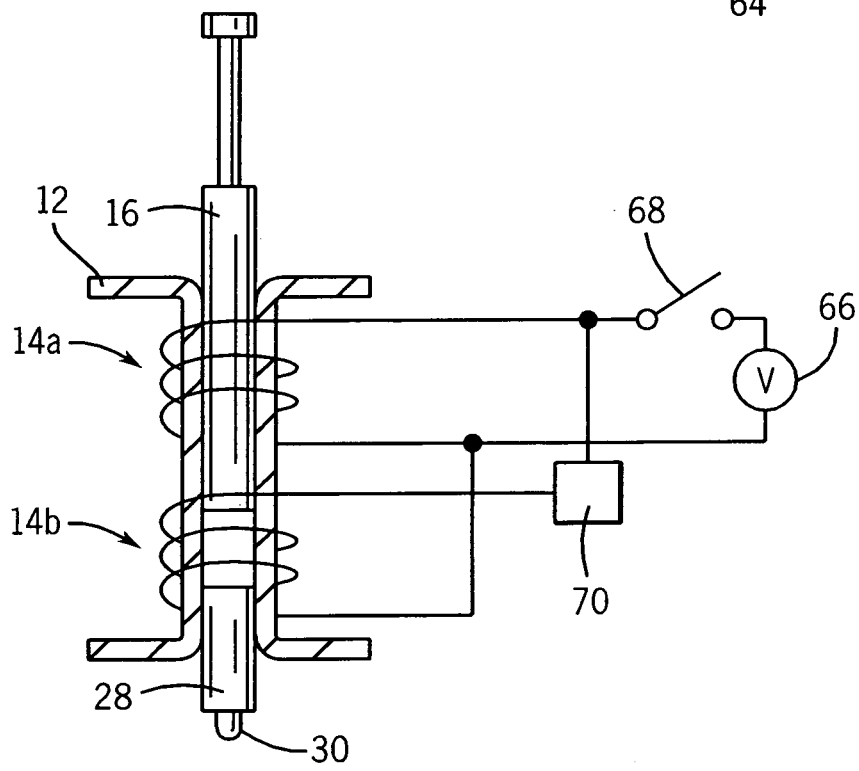
FIG. 6 is a cross-sectional view of the solenoid coil of FIGS. 1–4 showing a simple heating control circuit that allows control of the heating of the wax motor separately from the control of the magnetic force needed to attract the solenoid plunger.

Referring now to FIG. 6, in one embodiment, the solenoid coil 14 may be wound in two parts, a first coil portion 14a around one end of the tubular form 12 surrounding the plunger 16, and second coil portion 14b around the opposite end of the tubular form 12 surrounding the wax motor 28. During the actuation state of FIG. 2 above, a voltage 66 may be connected through a switch 68 (for example, as part of an appliance cycle timer) to the first coil portion 14a and through a heating control 70 to the second coil portion 14b.

Once the wax motor 28 is fully heated, the heating control 70 may stop the current through second coil portion 14b, for example, by opening a switch, or decrease the current through the second coil portion 14b, for example, by connecting a rectifier in series with the second coil portion to reduce the heating of wax motor 28 while ensuring the piston 30 remains fully extended and the plunger fully retracted. The heating control 70 may be a switch connected to a time delay, a thermostat, a current sensor, or the like.

Figure 7:
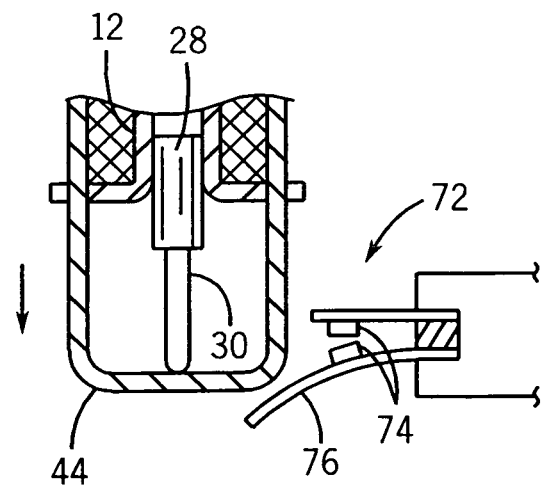
FIG. 7 is a fragmentary view of the bottom portion of the actuator of FIG. 4 showing a switch that may be used to reduce the heating of the wax motor in the actuation state.

Referring now to FIG. 7, heating control 70 may alternatively be a mechanical switch 72 operated by movement of the actuator 10. The switch may have opposed contacts 74 in series with the second coil portion 14b, one contact 74 mounted on a leaf spring 76 engaging with the bottom of the spanner 44 so that the contacts 74 are opened when the wax motor piston 30 is fully extended.

Figure 8:
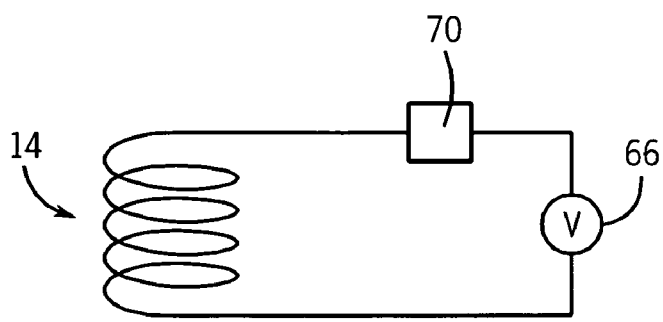
FIG. 8 is a generalized schematic of a heating control that may use a switch activated by a timer, current sensor, or thermal element as would be understood in the art.

Referring now to FIG. 8 alternatively, the heating control 70 may control the current to the entire singly wound solenoid coil 14, for example, using current control circuitry known in the art, for example, SCR or resistive current control.

Figure 9:
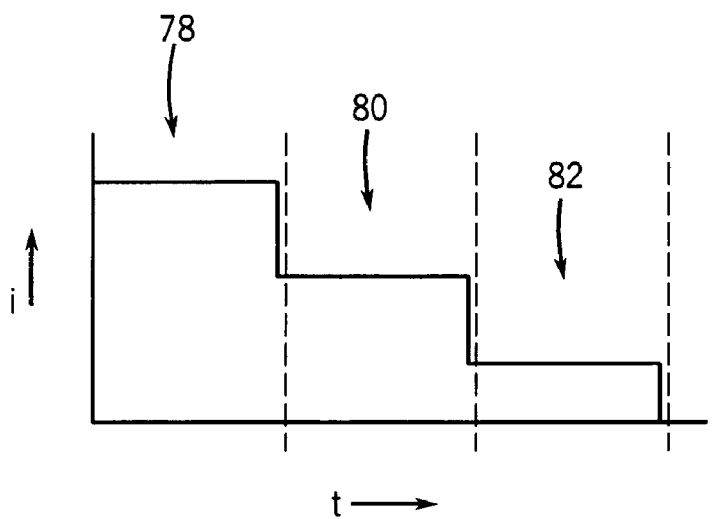
FIG. 9 is a plot of current versus time showing three levels of current control for the different states of FIGS. 2, 3 and 4.

Referring to FIG. 9, the heating control 70 of FIGS. 6 and 8 may, in one embodiment, control the current through the solenoid coil 14 according to a sub-state of the actuator 10. In a first sub-state 78 of the actuation state of FIG. 2, a large current is provided to the solenoid coil 14 to provide the strongest force of magnetic attraction of the plunger 16 and the most rapid heating of the wax motor 28. At a second sub-state 80 of the actuation state of FIG. 2, a lower current is provided commensurate with the lower forces required to retain the plunger 16 in the retracted position while still providing heating of the wax motor 28. In a third sub-state 82, the current is further reduced to that required to hold the plunger in place and reduce heating of the wax motor to a steady state heat requirement.

Figure 10:
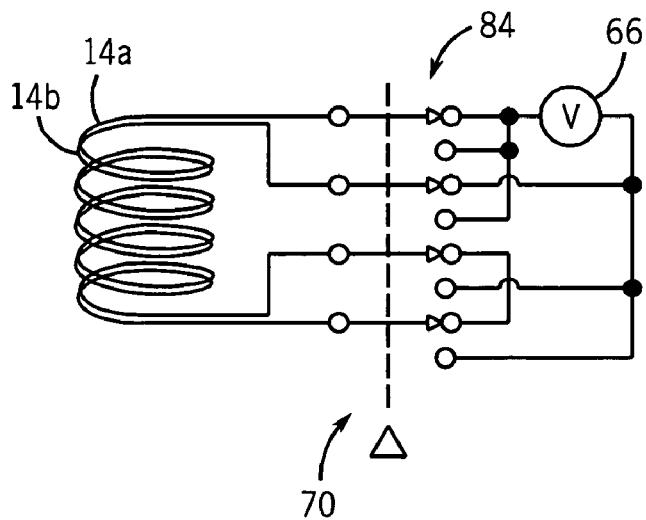
FIG. 10 shows a control circuit for a bifilar winding that may connect the windings in series or parallel to control total current therethrough.

Referring now to FIG. 10, in an alternative embodiment, solenoid coil 14 may be wound in bifilar fashion to provide co-extensive first coil portion 14a and second coil portion 14b. A switch circuit 84 which may be a mechanical or solid state switch may be operated in a first mode in which the switch throws are moved downward to provide for a parallel connection of the first coil portion 14a and second coil portion 14b, and hence relatively greater current flow and heating, and a second position shown in FIG. 10 in which the switch throws are moved upward providing for a series connection of the first coil portion 14a and second coil portion 14b, and relatively lesser current flow and heating.

It is specifically intended that the present invention not be limited to the embodiments and illustrations contained herein, but include modified forms of those embodiments including portions of the embodiments and combinations of elements of different embodiments as come within the scope of the following claims.

We claim:

1. A fast actuation, delayed release electrical actuator comprising:
   an electromagnetic actuator responding to an initiation of an electrical current to move an operator from a first position to a second position; and
   a thermal actuator responding to a cessation of the electrical current to delay movement of the operator from the second position to the first position for a predetermined period after cessation of the electrical current.

2. The fast actuation, delayed release electrical actuator of claim 1 wherein the thermal actuator is heated by current passing through an electromagnetic coil of the electromagnetic actuator.

3. The fast actuation, delayed release electrical actuator of claim 2 wherein the heating is inductive heating.

4. The fast actuation, delayed release electrical actuator of claim 2 wherein the heating is conductive heating.

5. The fast actuation, delayed release electrical actuator of claim 1 further including a heating control reducing heating of the thermal actuator after the operator has moved from the first position to the second position.

6. The fast actuation, delayed release electrical actuator of claim 5 wherein the heating control controls current to the electromagnetic actuator.

7. The fast actuation, delayed release electrical actuator of claim 6 wherein the heating control is a switch actuated by movement of the operator.

8. The fast actuation, delayed release electrical actuator of claim 6 wherein the heating control is a switch selected from the group consisting of a timer controlled switch, a current sensitive switch, and a heat sensitive switch.

9. The fast actuation, delayed release electrical actuator of claim 6 wherein the electromagnetic actuator includes a solenoid coil with multiple windings and wherein the heating control changes the winding connections of the multiple windings to control current to the electromagnetic actuator.

10. The fast actuation, delayed release electrical actuator of claim 9 wherein the multiple windings are alternately connected in series and parallel to control the current to the electromagnetic actuator.

11. The fast actuation, delayed release electrical actuator of claim 9 wherein the multiple windings are bifilar windings.

12. The fast actuation, delayed release electrical actuator of claim 9 wherein the multiple windings are spatially separate with one winding relatively more proximate to the thermal actuator than a second winding.

13. The fast actuation, delayed release electrical actuator of claim 1 wherein the thermal actuator is a wax motor and the electromagnetic actuator includes a solenoid coil wrapped around the wax motor.

14. The fast actuation, delayed release electrical actuator of claim 1 comprising:
    an electromagnet;
    a magnetically attractable actuator element;
    a wax motor in communication with the electromagnet to be heated thereby and having a piston extending in response to that heating; and
    a linkage moved by extension of the piston to hold the magnetically attractable material in proximity to the electromagnet when the wax motor is heated.

15. The fast actuation, delayed release electrical actuator of claim 14 wherein the electromagnet includes a solenoid coil wound around the wax motor having a piston, and wherein the wax motor piston extends along an axis of the solenoid coil in a first direction, and the magnetically attractable actuator element is movable along the axis in a second direction, and wherein the linkage is a rigid clip having a first end engaging a portion of the piston and a second end engaging a portion of the magnetically attractable actuator element to limit a maximum separation of the portions while allowing movement to lesser separations.

16. The fast actuation, delayed release electrical actuator of claim 15 further including a spring for biasing the magnetically attractable portion away from the electromagnet.

17. The fast actuation, delayed release electrical actuator of claim 16 further including a second spring biasing the clip against the portion of the wax motor.

18. The fast actuation, delayed release electrical actuator of claim 15 wherein the electromagnet and magnetically attractable actuator element form a solenoid.

19. The fast actuation, delayed release electrical actuator of claim 15 wherein electromagnet is wound around a stationary metal core and the magnetically attractable actuator element is a ferromagnetic armature hinging toward and away from the core.

* * * * *